United States Patent [19]
Meyer

[11] 3,746,378
[45] July 17, 1973

[54] STRUCTURAL ASSEMBLY AND DEFORMABLE CLIP

[75] Inventor: Engelbert A. Meyer, Union Lake, Mich.

[73] Assignee: USN Corporation, Boston, Mass.

[22] Filed: July 8, 1971

[21] Appl. No.: 160,785

Related U.S. Application Data

[63] Continuation-in-part of Ser. No. 831,570, June 9, 1969, abandoned.

[52] U.S. Cl. .............................. 287/189.36 R, 85/37
[51] Int. Cl. ............................................. F16b 5/04
[58] Field of Search .................. 85/37, 38, 71, 3; 287/189.35, 189.36 R; 52/717, 716

[56] References Cited
UNITED STATES PATENTS

| | | | |
|---|---|---|---|
| 1,203,669 | 11/1916 | Whiteside | 85/3 R |
| 1,364,461 | 1/1921 | Soss | 85/85 |
| 2,594,211 | 4/1952 | Poupitch | 85/38 |
| 2,267,379 | 12/1941 | Tinnerman | 52/717 |
| 2,682,090 | 6/1954 | Lautenschlager | 151/41.7 |

Primary Examiner—Edward C. Allen
Attorney—Burton and Parker

[57] ABSTRACT

The structural assembly disclosed herein includes a panel, a structural member overlying an aperture in the panel, and a sheet metal, deformable clip or "blind fastener" interconnecting the structural member and the panel. The clip is formed from a strip of sheet metal having a central head portion secured to the structural member, and leg portions first bowed inwardly and converging together opposite the head portion, and thence defining a pair of generally V-shaped portions extending through the aperture having distal ends overlying the panel surface and forming opposed channels grippingly embracing the marginal edges of the panel aperture upon deformation of the clip, to retain the structural member securely against the panel.

4 Claims, 9 Drawing Figures

PATENTED JUL 17 1973
3,746,378
SHEET 1 OF 3
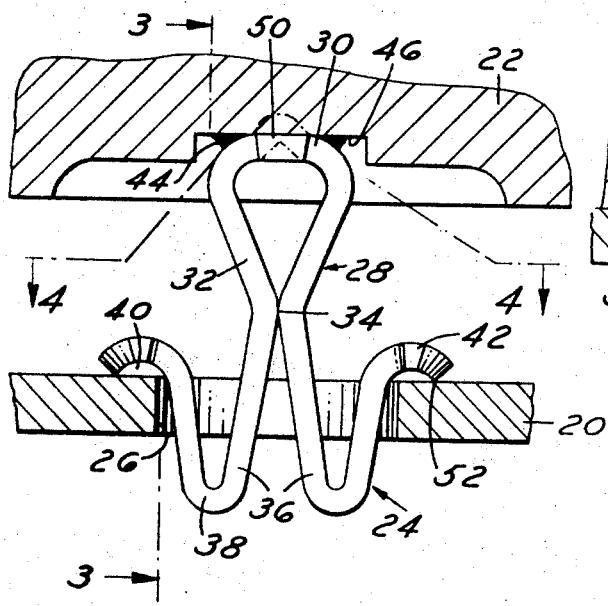
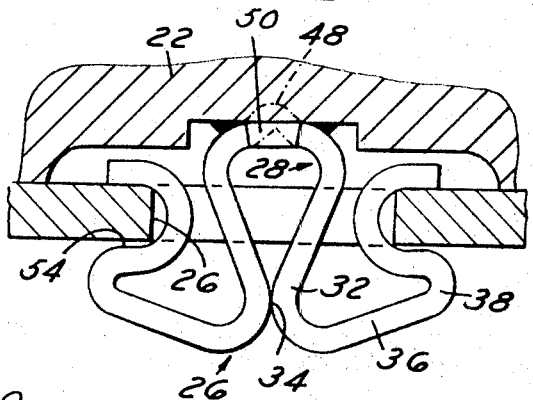
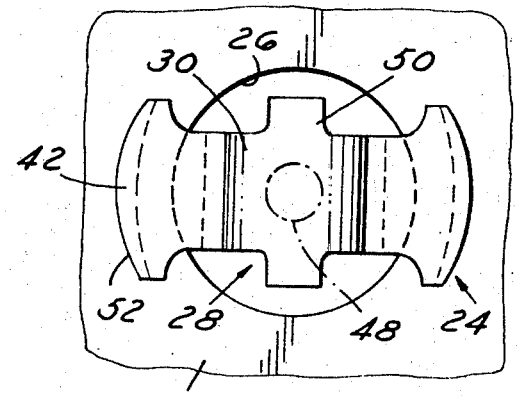
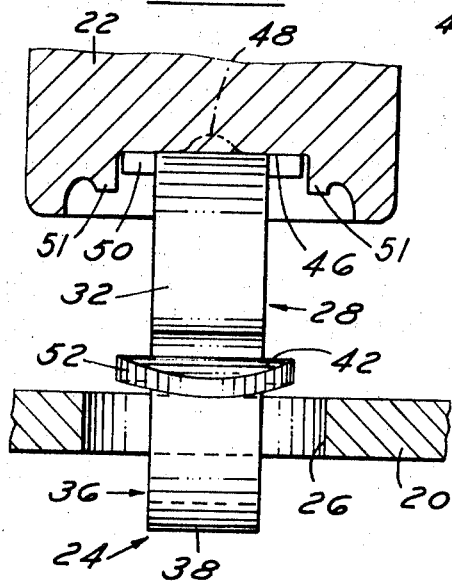
INVENTOR
ENGELBERT A. MEYER
BY
Burton & Parker
ATTORNEYS

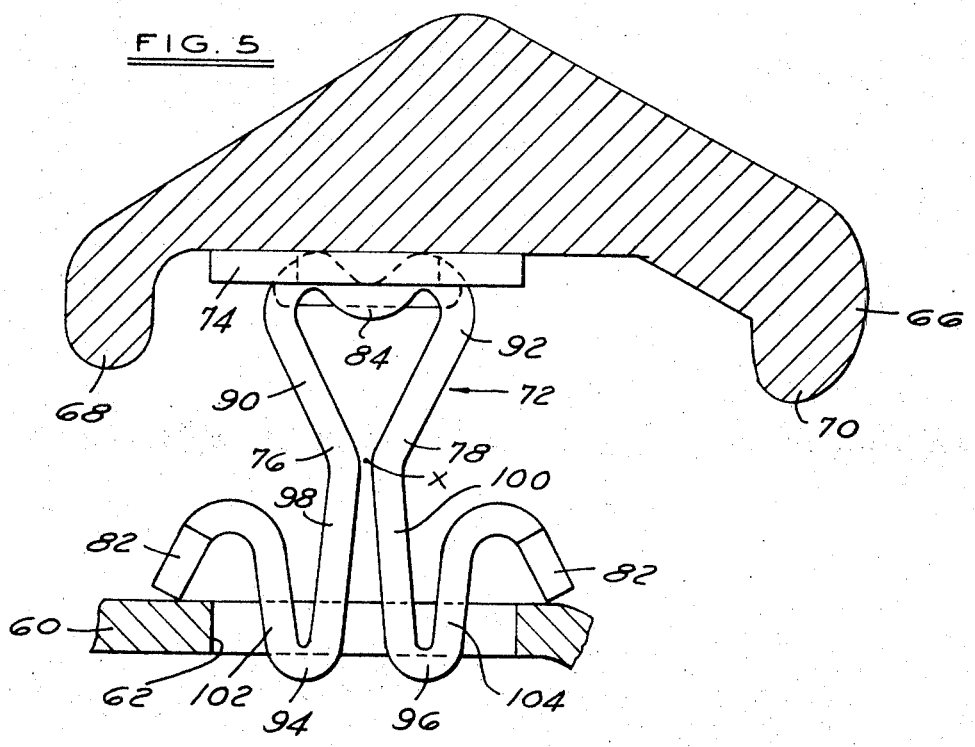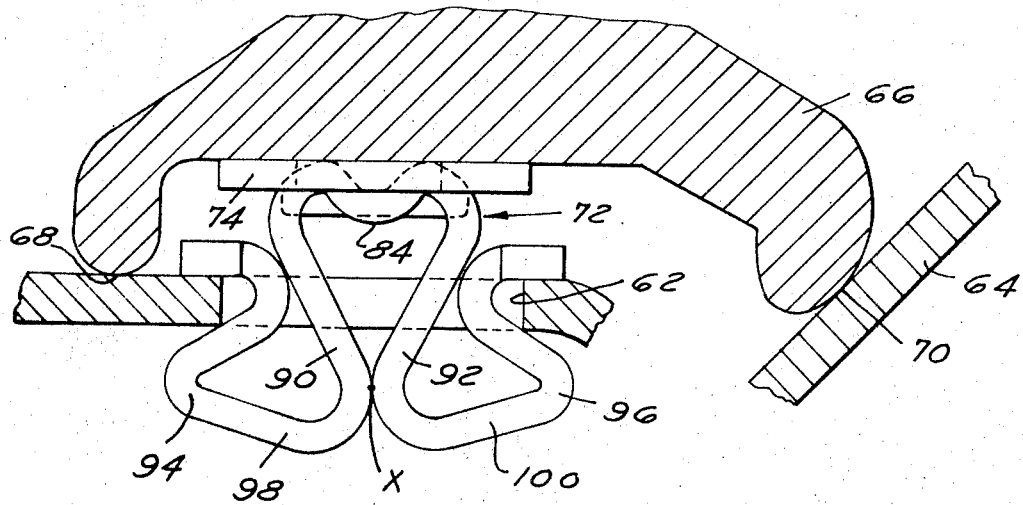

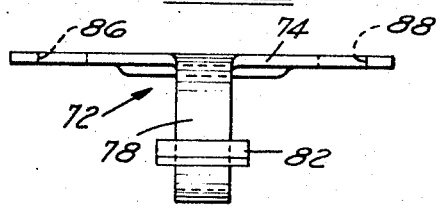
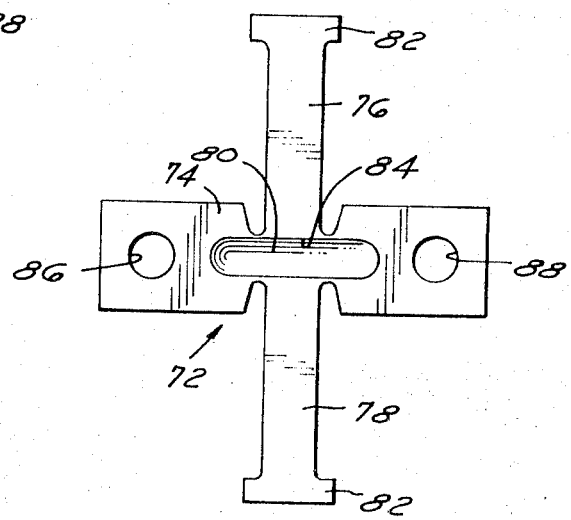
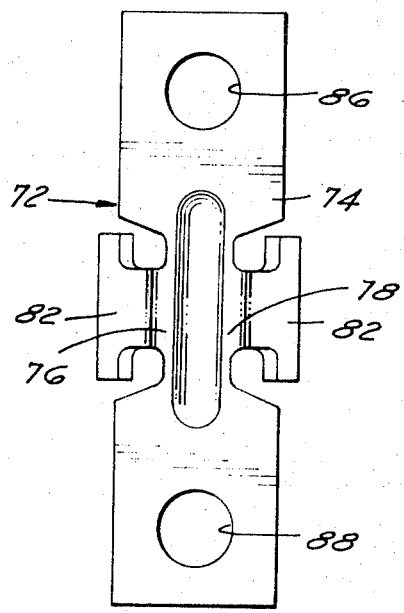
INVENTOR
ENGELBERT A. MEYER
BY
Burton & Parker
ATTORNEYS

STRUCTURAL ASSEMBLY AND DEFORMABLE CLIP

CROSS REFERENCE TO RELATED APPLICATION

This application is a continuation-in-part of my prior copending application Ser. No. 831,570 filed June 9, 1969, now abandoned.

DESCRIPTION OF THE PRIOR ART

The prior art includes a number of "blind fasteners" wherein a portion extending through the panel aperture is expanded to secure the fastener. A number of such fasteners include a central portion or protuberance which is impacted to deform the fastener, however the central portion is not adapted to be secured to a structural member, and the end portions do not adequately grip the panel.

SUMMARY OF THE INVENTION

The clip and structural assembly of this invention may be utilized to secure various structural members to panels or the like, including nameplates or emblems to automotive bodies or appliance housings, and a plurality of clips may be utilized to secure larger structural elements, such as trim pieces. In the preferred embodiment of this invention, the clip is relatively small when compared with blind fasteners presently utilized, to permit securement of relatively small structural elements. It is therefore important to the deformable clip of this invention to provide a secure assembly with a relatively small clip. A suitable size clip for automotive or appliance emblems or nameplates is formed from a flat strip or "wire" 0.018 inches thick, 0.150 inches wide, maximum, and 0.825 inches in length. The finished clip is 0.150 inches wide, 0.250 inches in length, 0.250 inches in height prior to deformation, and 0.162 inches in height after deformation.

The structural assembly of this invention includes a panel member or the like having an aperture. A suitable size aperture for the clip described hereinabove is 0.171 inches in diameter, and the panel may be an automotive body panel, an appliance housing, or other device. The structural member to be secured to the panel is received over the aperture, and secured thereto by a sheet metal, deformable clip or blind fastener secured to the structural member.

The deformable clip of this invention may be formed from a continuous strip of deformable, preferably resilient sheet metal, folded as described hereinbelow. A suitable material for the clip is stainless steel, which limits the corrosion between the metal surfaces. The disclosed embodiments of the clip each has a head portion at the midpoint of the strip adapted to be secured to the structural member. A pair of legs connected to opposite sides of the head converge to an "apex," and thence define a pair of V-shaped diverging leg portions adapted to be received through the aperture in the panel. The V-shaped portions extend downwardly and are bowed outwardly from the apex, and thence upwardly toward the head portion, terminating in outwardly projecting end portions adapted to overlie the panel, on the side thereof adjacent the structural member.

In one disclosed embodiment of the deformable clip of this invention, the head portion is provided with a welding dimple or protuberance to permit welding of the head portion to the structural member. The reversely folded leg portions are received through the aperture with their ends overlying the panel surface adjacent the aperture on the side thereof facing the structural member. The structural member is then forced toward the panel or support, causing the leg portions to spread about the apex and embrace opposite marginal edges of the aperture. The end portions of the clip are preferably initially curved toward the panel, providing opposed panel receiving channels upon deformation which serve to securely lock the clip on the panel. The distal edges of the end portions may be arcuate assuring a large area of contact adjacent the aperture. The end portions may also be enlarged for this purpose.

Other advantages and meritorious features will more fully appear from the following specification and claims, wherein:

BRIEF DESCRIPTION OF THE DRAWINGS

FIG. 1 is a side view partially in section, of a structural assembly embodying the invention, showing the clip prior to deformation;

FIG. 2 is a side view similar to FIG. 1 showing the clip after deformation;

FIG. 3 is an end view of the structural assembly shown in FIG. 1, taken in the direction of arrows 3—3;

FIG. 4 is a top view of the structural assembly shown in FIG. 1, taken in the direction of arrows 4—4;

FIG. 5 is a side view similar to FIG. 1 showing another embodiment of the clip and a differently shaped structural member;

FIG. 6 is a side view similar to FIG. 5 showing the clip of FIG. 5 after deformation;

FIG. 7 is a plan view of the blank from which the clip of FIGS. 5 and 6 is formed;

FIG. 8 is a plan view of the clip of FIGS. 5 and 6 formed into shape for securement to the structural member; and FIG. 9 is a side view of the clip shown in FIG. 8.

DESCRIPTION OF THE PREFERRED EMBODIMENT

The embodiment of the structural assembly shown in FIGS. 1, 3 and 4 includes a panel member 20, a structural member 22, and a deformable sheet metal clip 24 interconnecting the structural member and the supporting panel. The panel 20 may be any supporting structure, such as described hereinabove, including an automobile or truck body panel, and appliance housing or other structural element. The structural member 22 may be an emblem or nameplate, or a larger structural member requiring a number of clips, such as a molding or trim strip. The clip 24 is preferably secured to the structural member prior to assembly, and is received in an aperture 26 provided in the panel.

This embodiment of the clip includes a head or base portion 30 secured to the structural member 22, and upper leg portions 32 abutting opposite the base portion at an "apex" 34. These legs extend downwardly to define a pair of portions 36 which are received through the aperture 26 and are reversely folded at 38 to define V-shapes having distal ends 42 adapted to overlie the panel surface at 40 adjacent the aperture 26. The leg end portions 42 are curled toward the supporting panel 20, as described hereinbelow.

The clip is preferably formed from a continuous flat strip or "wire," which is folded in a progressive die or the like to provide the head portion 30 near the midportion of the blank. The clip must be deformable, and is preferably relatively resilient to maintain the tensioned engagement described. The clip may, for example, be formed from a strip of stainless steel, having the additional advantage of being corrosion resistant.

In this embodiment, the base portion 30 is welded, as shown at 44, to the structural member 22, which includes a groove or notch 46 receiving the head portion of the clip. The head portion may be provided with a welding dimple or projection, shown in phantom at 48, which melts during weldint to provide the connection shown. This embodiment of the clip is also provided with tabs 50 which may be utilized to "stake" the clip in place, instead of welding it, in which event the member 22 is provided with a pair of ears 51 to be bent inwardly over the clip (FIG. 3). The tabs 50 may also serve to locate the clip in the groove 46, and are utilized as a carrier in the die during the forming operation.

As described hereinabove, this embodiment of the clip is suitable for securing relatively small structural members, such as automotive or appliance emblems. In this embodiment, the clip may be quite small, while providing a secure assembly. The end portions 42 of the clip are preferably enlarged, as shown in FIG. 4, and have an arcuate edge 52 defining a constant clearance about the aperture 26, assuring full engagement at the clip ends.

The reversely folded or V-shaped portions 38 of the clip are inserted through the panel aperture 26, engaging the enlarged end portions 42 against the panel surface 40 adjacent the aperture. The structural member is then forced toward the panel, which deforms the leg portions 36 about the apex 34, as shown in FIG. 2. The "curled" end portions 42 of the clip also pivot about their point of contact with the panel to define opposed channels 54 which embrace the opposite marginal edges of the aperture 26. The clip of this invention therefore grips the panel, providing a very secure assembly. The clip may be deformed and the structural member secured by a single impact of a hammer or the like. A rubber hammer or mallet may be used where the structural member may be marred. The structural member may alternatively be urged toward the support under constant pressure, by hand, especially where a series of clips is utilized to secure a relatively large structural member such as a molding or trim strip.

A second embodiment of the invention is shown in FIGS. 5–9 wherein there is shown a panel or the like 60 having an aperture 62 therethrough, and a panel portion 64 angularly positioned with respect to the main panel 60. A structural member 66 in the form of a medallion, nameplate, emblem or the like, which is to be secured to the panel may be of irregular cross section, with opposite ends 68 and 70 adapted to engage the panel surfaces, as shown in FIGS. 5 and 6. The member 66 is connected to the panel by a fastener or clip 72 similar to the clip 28 previously described.

The clip 72 is made of a planar sheet metal blank shown in FIG. 7 having a head portion 74 and a pair of oppositely extending legs 76 and 78 positioned at the midportion 80 of the head. Each leg has an enlarged distal end 82. Head 74 has a longitudinally extending trough-like depression 84 which serves to rigidify and reinforce it, and is also provided with a pair of spaced-apart apertures 86 and 88 for securing the clip 72 to the structural member 66. A similarly spaced pair of protuberances (not shown) on the member 66 may extend through the apertures 86 and 88 and be peened over or otherwise deformed to overlie the marginal aperture edges, thereby securing the clip and member together. In the event the member 66 is made of plastic, the protuberances can be deformed by heating them and then applying pressure. Of course, a metal structural member may be welded or staked to the clip as hereinabove described with reference to FIGS. 1–4.

The clip legs 76 and 78 are each bent in a die or the like to the position shown most clearly in FIGS. 5 and 6, the upper portions 90 and 92 of the legs respectively, converging from their spaced points of juncture with head 74, and their lower portions 94 and 96 each being of substantially V-shape and diverging, the distal end of each leg being enlarged as shown at 82. These enlarged end portions are outwardly and downwardly displaced so that in the initial, undeformed position of the clip shown in FIG. 5, each end portion 82 extends toward the panel 60 at an acute angle with respect to the axis of panel aperture 62. It should be noted that the aperture 62 may be of any desired regular configuration, e.g. circular, square, rectangular or oval.

In the assembly of the parts shown in FIGS. 5 and 6, the clip 72 is first secured to the member 66 in any convenient fashion dictated by the character of the member 66 as above indicated. The clip 72 is then positioned over panel aperture 62 as shown in FIG. 5, with the reversely bent or V-shaped legs 94 and 96 projecting through the aperture and the distal leg ends 82 overlying the panel surface facing the member 66. Thereafter the member 66 is urged toward the panel until its marginal edges 68 and 70 abut the panel surface, thereby deforming the clip 72 to the position shown in FIG. 6. This may be accomplished by striking the member 62 with a tool such as a rubber hammer where the member will not be defaced or damaged thereby, or may be done by manual pressure exerted on the member 62.

As can be seen by reference to FIGS. 5 and 6, the clip legs 76 and 78 have upper portions 90 and 92 which extned in converging relation to the point X, and lower portions 94 and 96 of V-shape, the adjacent portions 98 and 100 of which diverge from point X to the apex of the V. The relative positions of the upper leg portions 90 and 92 remain substantially constant during clip deformation, the bending occurring in the leg portions 94 and 96 below the point X as shown. Because of the converging-diverging relationship of the legs, force against the clip head 74 transmitted through member 66 causes the leg portions 98 and 100 to pivot about point X as such point is displaced toward the panel 60. The radius of curvature between the end portions 82 and the portions 102 and 104 of the legs is such that before the clip reaches its fully deformed position shown in FIG. 6, the clip surfaces will engage and grip opposite marginal edges of the aperture 62 on both sides of the panel 60. Continued force on the clip will shift the point X to the position of FIG. 6, at which the leg portions 98 and 100 extend outwardly and back toward the panel. There is thus an "over center" or "toggle" action, whereby once the leg portions 98 and 100 are shifted past a position parallel to the panel 60, they act to hold the member 66 tight against the panel surface. This same condition is present in the FIG. 1–4 embodiment, where the leg portions 36 assume the same orientation, and thus serve to exert a force tending to retain the structural member 22 in engagement with the surface of panel 20. In addition, in both embodiments, the marginal edges of the panel aperture are tightly gripped by the clip to retain the structural member 22 or 66 against shiftable movement in any direction.

What is claimed is:

1. A structural assembly comprising a panel member of predetermined thickness having an aperture opening therethrough, a structural member spanning said aperture and having surface portions abutting a panel surface, and a deformable clip comprising an integral strip of resilient material defining a central head portion fixedly secured to a surface of said structural member in axial alignment with the panel aperture, a pair of legs having upper portions extending in converging relation from opposite sides of said head toward a common point initially located between the structural member and the panel and lower portions of substantially V-shape extending in diverging relation away from said common point and projecting through said panel aperture and terminating in enlarged distal end portions spaced apart a distance sufficient to receive said converging upper portions therebetween and overlying the panel surface adjacent the structural member on opposite sides of said aperture, said lower leg portions being deformed radially outwardly to grip the panel between said distal end portions and said lower leg portions, the distance between the under surface of the structural member and said common point being appreciably greater than said panel thickness whereby said lower leg portions extend toward the panel when the structural member is at its limit of approach toward the panel to tension said member against the panel.

2. A structural assembly as defined in claim 1 characterized in that said structural member has a recess in its panel facing surface within which the head of said clip is disposed.

3. A structural assembly as defined in claim 1 characterized in that said clip is fixedly secured to said structural member by welding.

4. A structural assembly as defined in claim 1 characterized in that said structural member exhibits at least one projection and said head portion of the clip has a corresponding number of aligned apertures, said clip being fixedly secured to said structural member by deformation of said projection to overlie the clip adjacent said aperture.

* * * * *